United States Patent Office 3,458,519
Patented July 29, 1969

3,458,519
QUINOLYLANTHRANILIC ACID COMPOUNDS
AND METHODS FOR THEIR PRODUCTION
Robert A. Scherrer, Ann Arbor, Mich., assignor to Parke,
Davis & Company, Detroit, Mich., a corporation of
Michigan
No Drawing. Filed May 2, 1966, Ser. No. 546,505
Int. Cl. C07d 33/52, 101/16
U.S. Cl. 260—287       7 Claims

ABSTRACT OF THE DISCLOSURE

N-5-quinolylanthranilic acids, in which the 5-quinolyl group is optionally substituted at position 2 by methyl and is substituted at position 6 by methyl or chlorine, salts and esters thereof, and their production by (a) reacting either an o-halobenzoic acid, or a salt or lower alkyl ester thereof, with a suitably substituted 5-aminoquinoline, or an o-amino-benzoic acid, or a salt or lower alkyl ester thereof, with a suitably substituted 5-haloquinoline; (b) reacting a 2-aryliodoniobenzoate with a suitably substituted 5-aminoquinoline; and (c) reacting one of the N-5-quinolylanthranilic acids or a salt thereof with an esterifying agent to produce one of the lower alkyl or aminoalkyl esters. The compounds are useful as anti-inflammatory agents.

SUMMARY AND DETAILED DESCRIPTION

The present invention relates to new N-5-quinolylanthranilic acids, to salts and esters thereof, and to methods for their production. More particularly, the invention relates to compounds having the formula,

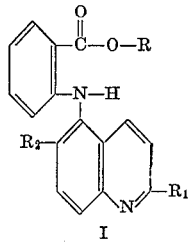

I and to pharmaceutically-acceptable salts thereof; where R represents hydrogen, a lower alkyl radical, or an aminoalkyl radical; $R_1$ represents hydorgen or methyl; and $R_2$ represents methyl or chlorine. The aminoalkyl radical can be present in free bas or acid-addition salt form.

In the foregoing formula the lower alkyl radicals are preferably those containing not more than four carbon atoms. The aminoalkyl radicals can be represented by the formula,

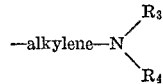

wherein $R_3$ and $R_4$ are lower alkyl radicals having not more than four carbon atoms; and the alkylene group contains not more than four carbon atoms, separating the groups to which it is attached by at least two carbon atoms.

In accordance with the invention, N-5-quinolylanthranilic acid compounds, having the formula,

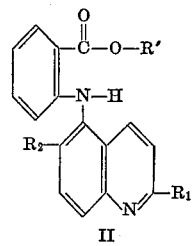

II are produced by reacting a benzoic acid derivative, having the formula

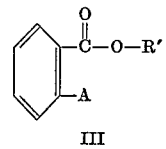

III with a quinoline compound, having the formula,

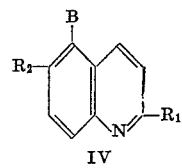

IV where $R_1$ and $R_2$ have the same meaning as given above; R' represents hydrogen, lower alkyl, or a salt-forming cation, preferably an alkali metal cation; and one of A and B is halogen, preferably bromine, and the other is amino. Best results are obtained when A is halogen and B is amino. The reaction is preferably carried out in the presence of a copper-containing catalyst, such as cupric bromide or cupric acetate, and a proton acceptor. In carrying out the reaction, it is generally satisfactory to employ substantially equivalent quantities of the reactants in the presence of a suitable solvent. Some examples of such solvents are N,N-dimethylformamide, N,N-dimethylacetamide, diethylene glycol dimethylether, dimethyl sulfoxide, nitrobenzene, higher boiling hydrocarbons, and lower aliphatic alcohols, such as isopropyl alcohol, n-butyl alcohol, amyl alcohol, isoamyl alcohol, and the like. Preferred solvents are isopropyl alcohol, N,N-dimethylformamide, N,N-dimethylacetamide, and diethylene glycol dimethylether. The temperature and duration of the reaction may be varied over a wide range; a temperature in the range of 75–250° C. and a period of from 4 to 72 hours are satisfactorily employed.

The quantity of the proton acceptor employed in the reaction can be varied within wide limits. In general, sufficient should be used to bind the benzoic acid reactant and the hydrohalic acid formed in the course of the reaction. Some of the proton acceptors which can be used when the benzoic acid derivative is employed in free in acid form are alkali metal carbonates, preferably potassium carbonate; cupric carbonate; cuprous carbonate and the like. When an alkali metal salt, preferably the potassium salt, of the benzoic acid reactant is employed, the following substances can be used as the proton acceptor: calcium hydride, alkali metal carbonates, such as, e.g., potassium carbonate, and tertiary organic amines such as N-ethylmorpholine. If desired, two or more equivalents of the amine reactant can be used in which case one equivalent takes part in the condensation and the remainder acts as the proton acceptor.

The benzoic acid reactant is advantageously added to the reaction mixture in the form of its preformed alkali metal salt, preferably the potassium salt. Alternatively, the potassium salt of the benzoic acid reactant can be conveniently prepared in situ in a very finely divided condition by adding potassium carbonate to a boiling solution of the free acid form of the corresponding benzoic acid derivative in the solvent employed in the reaction. In the latter case, it is often advantageous to remove most of the water formed in the neutralization by distilling some of the solvent prior to the addition of the catalyst and other reactant.

Also in accordance with the invention, N-5-quinolylanthranilic acid compounds having the formula

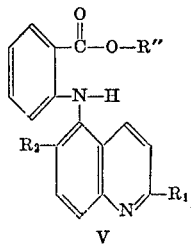

V are produced by reacting a 2-aryliodoniobenzoate having the formula

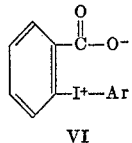

VI with a 5-aminoquinoline compound having the formula

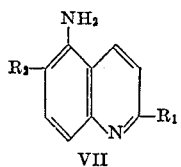

VII where $R_1$ and $R_2$ are as defined earlier; R'' represents hydrogen or a metal cation, preferably an alkali metal cation; and Ar is a monovalent, homocyclic or heterocyclic aromatic radical that may be unsubstituted or substituted one or more times with various groups in such manner that it is not activated toward nucleophilic attack. For purposes of the invention, such an aryl radical may be described as unactivated. In accordance with the foregoing definition, Ar can represent phenyl, naphthyl, thienyl, furyl, and other similar unsubstituted aromatic radcals, as well as these same radicals substituted with lower alkyl, especially methyl, lower alkoxy, especially methoxy, halogen, and various combinations of these. In accordance with the definition, it is highly desirable that Ar not contain an electron-attracting substituent, such as nitro, cyano, carboalkoxy, or carboxy. The precise nature of Ar is not critical, however, since, during the reaction, Ar together with the iodine ion to which it is attached are displaced from the 2-aryliodoniobenzoate to form an aryl iodide, which is a secondary product of the process. Preferred 2-aryliodoniobenzoates for use in the reaction are 2-phenyliodoniobenzoate and 2-mesityliodoniobenzoate.

The reaction is normally carried out in a solvent medium at a temperature below about 150° C. Suitable solvents are water; lower alkanols, such as ethanol and isopropanol; glycol ethers, such as 1,2-dimethoxyethane; tertiary amides, such as N,N-dimethylformamide and N,N-dimethylacetamide; and ethylene chloride. In place of an added solvent, in appropriate cases an excess of the amine compound of Formula VII may be employed. Best results are obtained when the reaction is carried out at a temperature in the range of 50–100° C., although temperature outside this range, from room temperature to about 150° C., may also be used. The duration of the reaction is not critical, and may be varied over a wide range, from 30 minutes to 48 hours. Equivalent quantities of reactants may be used, although a slight excess of either reactant is not harmful. In most cases, the yield of final product is improved when the reaction is carried out in the presence of a catalytic amount of a copper salt, such as cupric acetate or cuprous chloride. Such a catalyst is not essential, however. The reaction product can be isolated directly, or following conversion to a salt form.

The 2-aryliodoniobenzoates of Formula VI, used as starting materials in the process of the invention, are prepared by reacting o-iodobenzoic acid with an oxidizing agent, such as potassium persulfate, in a strong acid, such as sulfuric acid, followed by in situ condensation with an aromatic compound having the formula

VIII where Ar has the same meaning as described earlier.

The lower alkyl N-5-quinolylanthranilate compounds of the invention having the formula

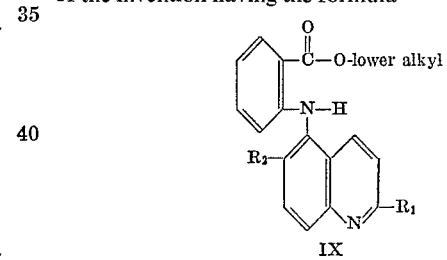

IX are produced by reacting an N-5-quinolylanthranilic acid compound having the formula

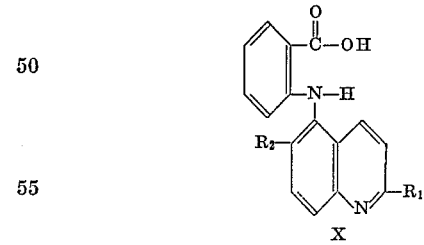

X or an alkali metal salt thereof with an esterifying agent; where $R_1$ and $R_2$ are as defined previously. Some examples of suitable esterifying agents are lower alkanols, such as methanol and ethanol, esters of lower alkanols, such as methyl bromide, methyl iodide, ethyl iodide, and dimethyl sulfate, and diazomethane.

When the esterifying agent is a lower alkanol, the process is preferably carried out by heating the free acid in an excess of the lower alkanol in the presence of an acidic catalyst, such as hydrogen chloride, sulfuric acid, or benzenesulfonic acid. Additional solvents such as tetrahydrofuran, dioxane or diethylene glycol dimethyl ether may be present but are not necessary. The reaction is commonly carried out at a temperature in excess of 25° C., preferably at 60–150° C., but not higher than the reflux temperature, and is normally completed within 5 to 100 hours.

When the esterifying agent is an ester of a lower alkanol as described above, the process is preferably carried out by heating the anthranilic acid or salt thereof with the selected alkyl halide, dialkyl sulfate, or other alkyl ester derivative in a solvent in the presence of a base. Some examples of suitable solvents are lower alkanols, tetrahydrofuran, dioxane, dimethylformamide, diethylene glycol dimethyl ether, and mixtures thereof. Some examples of suitable bases are alkali metal hydroxides and carbonates, alkaline earth metal hydroxides, alkali metal alkoxides, and, in non-hydroxylic solvents, alkali metal hydrides. Approximately equivalent quantities of the anthranilic acid compound and the esterifying agent are normally employed. The reaction is usually carried out at a temperature from 25 to 150° C., preferably from 50 to 100° C., and under these conditions it is substantially complete within 24 hours.

When the esterifying agent is diazomethane, the process is preferably carried out in an unreactive solvent such as ether, tetrahydrofuran, diethylene glycol dimethyl ether or dioxane. The reaction proceeds very rapidly and is preferably carried out by treating the free acid with one equivalent or a slight excess of diazomethane at 0 to 25° C., under which conditions the esterification is complete within less than 5 minutes.

The alkali metal salts of the N-5-quinolylanthranilic acids of Formula X required as starting materials in the foregoing process are prepared by reacting the free acids with an alkali metal hydroxide or an alkali metal carbonate.

The aminoalkyl N-5-quinolylanthranilate compounds of the invention having the formula

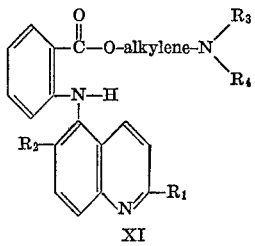

XI and acid-addition salts thereof are produced by reacting an N-5-quinolylanthranilic acid compound having Formula X above, or an alkali metal salt thereof, with an aminoalkyl halide compound having the formula

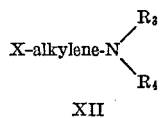

XII where X is a halogen atom, preferably chlorine or bromine, and $R_3$, $R_4$, and "alkylene" are as defined earlier. The aminoalkyl halide is preferably utilized in the form of the corresponding hydrohalide salt. For reasons of economy the reaction is usually carried out in the presence of one or more equivalents of a substance having a greater base strength than the aminoalkyl halide. Some examples of suitable basic compounds are tertiary amines, such as triethylamine and N-ethylpiperidine, and inorganic bases such as the alkali metal carbonates, alkali metal bicarbonates, alkaline earth metal carbonates, and alkaline earth metal oxides. The reaction is carried out under substantially anhydrous conditions in an inert organic solvent such as N,N-dimethylformamide, benzene, xylene, and toluene. Usually, the N-5-quinolylanthranilic acid and the aminoalkyl halide are used in approximately equivalent quantities. When the free N-5-quinolylanthranilic acid and the free base aminoalkyl halide are so used, approximately one equivalent of a basic compound is employed and the desired aminoalkyl ester is obtained in the reaction mixture as the free base. Alternatively, when a hydrohalide salt of the aminoalkyl halide is employed, approximately two equivalents of the basic compound are preferably used and the aminoalkyl ester is again obtained as the free base. The temperature of the reaction is not critical and may be varied from about 50 to 125° C. The preferred reaction temperature is in the neighborhood of 100° C., that is, between about 85 and 110° C.

The aminoalkyl N-5-quinolylanthranilate compounds can be isolated in the foregoing procedures either as the free base or as an acid-addition salt, by appropriate adjustment of the pH.

The N-5-quinolylanthranilic acid compounds of the invention, represented by Formula I, form acid-addition salts with a variety of inorganic and organic acids. Some examples of pharmaceutically-acceptable acid-addition salts that can be prepared either as described above or by reaction with the corresponding acid are the hydrochloride, hydrobromide, hydroiodide, sulfate, phosphate, acetate, propionate, citrate, tartrate, sulfamate, and benzenesulfonate. The preferred acid-addition salts are the mineral acid salts.

The "free acid" compounds of the invention, that is, the compounds of Formula I wherein R is hydrogen, also form carboxylate salts with a variety of inorganic and organic bases. Some typical examples of these salts are the sodium, potassium, calcium, aluminum, magnesium, ammonium, choline, 2-hydroxyethylammonium, bis(2-hydroxyethyl)ammonium, tris(2-hydroxyethyl)ammonium and like salts. The preferred carboxylate salts are the pharmaceutically-acceptable salts of an alkali metal, an alkaline earth metal, ammonia, or a substituted ammonia.

The carboxylate salts and acid-addition salts with pharmaceutically-acceptable cations and anions differ in solubility properties from the "free acids" and free bases, but are otherwise equivalent for purposes of the invention.

The compounds of the invention are new chemical compounds that are useful as pharmacological agents. They are anti-inflammatory agents that are of value in mitigating the symptoms associated with inflammatory conditions as well as in preventing or suppressing the occurrence of inflammation. They are preferably administered by the oral route atlhough parenteral administration can also be used. They can be employed in "free acid," ester, or salt form, and can be combined with either a solid or liquid carrier or diluent and made available in varying amounts in such pharmaceutical forms as tablets, capsules, powders, and aqueous and non-aqueous suspensions and solutions. The preferred compounds of the invention are the "free acid" compounds, that is, the N-5-quinolylanthranilic acid compounds of Formula I wherein R is hydrogen, and their pharmaceutically-acceptable salts.

The invention is illustrated by the following examples.

Example 1

A mixture consisting of 22.1 g. of potassium o-bromobenzoate, 13.3 g. of 5-amino-6-methylquinoline, 1.0 g. of cupric bromide, 10.5 ml. of N-ethylmorpholine, and 25 ml. of N,N-dimethylformamide is stirred and heated under nitrogen at 114–120° C. for 8 hours. The reaction mixture is diluted with 80 ml. of 5% aqueous sodium hydroxide, the alkaline mixture is filtered and the filtrate is washed well with ether. The filtrate is then acidified with dilute hydrochloric acid, and the tarry precipitate is isolated and triturated with hot water. The solid N-(6-methyl-5-quinolyl)anthranilic acid that is thus obtained is purified further by crystallization from aqueous diethylene glycol dimethyl ether; M.P. 240–242° C. (with decomposition).

By utilizing the foregoing procedure, the following N-5-quinolylanthranilic acids are obtained from the reaction of potassium o-bromobenzoate with the specified amount of the designated aminoquinoline compound:

(a) From reaction with 15.0 g. of 5-amino-6-chloroquinoline there is obtained N-(6-chloro-5-quinolyl)-anthranilic acid; M.P. 195–197° C., following successive crystallizations from aqueous ethanol and aqueous isopropyl alcohol.

(b) From reaction with 14.5 g. of 5-amino-2,6-dimethylquinoline there is obtained N-(2,6-dimethyl-5-quinolyl)

anthranilic acid; M.P. 249–250.5° C. (with decomposition), following crystallization from isopropyl alcohol.

The sodium salt of N-(6-methyl-5-quinolyl)-anthranilic acid is prepared by treating a solution of 5.0 g. of the "free acid" in ethanol with an equivalent amount of sodium hydroxide dissolved in ethanol, and evaporating the resulting mixture to dryness under reduced pressure.

A mixture of 1.4 g. of choline chloride and 3.0 g. of sodium salt of N-(6-methyl-5-quinolyl)anthranilic acid in 75 ml. of ethanol is heated to about 70° C. for 10–15 minutes. The sodium chloride that forms is removed by filtration and the filtrate is concentrated under reduced pressure to give the choline salt of N-(6-methyl-5-quinolyl)anthranilic acid.

The ammonium salt of N-(6-methyl-5-quinolyl)-anthranilic acid is prepared by dissolving the "free acid" in hot ethanol, treating the solution with an excess of ammoniacal ethanol, and evaporating the mixture to dryness under reduced pressure.

The hydrochloride salt of N-(6-chloro-5-quinolyl)-anthranilic acid is prepared by treating a solution of 500 mg. of N-(6-chloro-5-quinolyl)anthranilic acid in 25 ml. of acetone with an excess of dry hydrogen chloride and isolating and drying the precipitated salt; M.P. 235–239° C. (with decomposition).

Example 2

A mixture consisting of 25.4 g. of 2-phenyliodoniobenzoate, 12.7 g. of 5-amino-6-chloroquinoline, 0.5 g. of anhydrous cupric acetate, and 100 ml. of diethylene glycol dimethyl ether is heated under reflux in a nitrogen atmosphere for 5 days. The solvent is evaporated from the mixture under reduced pressure, and the residue is dissolved in 200 ml. of dilute aqueous sodium hydroxide. The alkaline solution is washed with ether, filtered, and acidified carefully with dilute hydrochloric acid to give N - (6 - chloro - 5 - quinolyl) - anthranilic acid; M.P. 195–197° C., following successive crystallizations from aqueous ethanol and aqueous isopropanol. The acetic acid salt, M.P. 127–131° C., is obtained by crystallizing the N-(6-chloro-5-quinolyl)anthranilic acid from aqueous acetic acid.

In the foregoing procedure, the same product is obtained when an equivalent amount of 2-mesityliodoniobenzoate is substituted for the 2-phenyliodoniobenzoate.

Example 3

A mixture consisting of 45.2 g. of 2-phenyliodoniobenzoate, 20.0 g. of 5-amino-2,6-dimethylquinoline, 0.9 g. of anhydrous cupric acetate, and 120 ml. of isopropyl alcohol is heated under reflux in a nitrogen atmosphere for 20 hours. The solvent is evaporated from the mixture under reduced pressure, and the residue is treated with 200 ml. of dilute aqueous sodium hydroxide. The alkaline mixture is heated on the steam bath to dissolve most of the solid, filtered while hot, and the filtrate is acidified to pH 6 with dilute hydrochloric acid. The solid that precipitates is isolated, dried, and stirred with 500 ml. of hot benzene to remove impurities. The benzene extract is discarded, and the solid residue is treated with 1000 ml. of hot methanol. The hot methanolic mixture is filtered, cooled, and diluted with 200 ml. of water. The precipitated solid is combined with the solid isolated by filtration of the methanolic mixture and the combined solids are extracted into ether. Upon evaporation of the dried ether extract, there is obtained N-(2,6-dimethyl-5-quinolyl)anthranilic acid; M.P. 249–250.5° C. (with decomposition), following crystallization from isopropyl alcohol.

The potassium salt of N-(2,6-dimethyl-5-quinolyl)-anthranilic acid is prepared by treating a solution of 5.0 g. of the "free acid" in ethanol with an equivalent amount of potassium hydroxide dissolved in ethanol, and evaporating the resulting mixture to dryness under reduced pressure.

Example 4

A mixture consisting of 8.3 g. of N-(6-methyl-5-quinolyl)anthranilic acid, 100 ml. of absolute ethanol and 5 ml. of concentrated sulfuric acid is heated under reflux for 24 hours. Upon cooling, the solution is diluted with 500 ml. water, made basic with aqueous sodium carbonate and the basic mixture is extracted with ether. The ether extract is washed well with water, dried, and evaporated under reduced pressure to yield ethyl N-(6-methyl-5-quinolyl)anthranilate.

In the foregoing procedure, with the substitution of 9.0 g. of N-(2,6-dimethyl-5-quinolyl)anthranilic acid for the N-(6-methyl-5-quinolyl)anthranilic acid and 100 ml. of methanol for the ethanol, there is obtained methyl N-(2,6-dimethyl-5-quinolyl)anthranilate.

The hydrochloride salt of ethyl N-(6-methyl-5-quinolyl)anthranilate is prepared by treating a solution of 1.0 g. of the ester in 25 ml. of acetone with an excess of dry hydrogen chloride, evaporating the mixture to dryness, and isolating and drying the solid salt obtained.

Example 5

A mixture consisting of 2.9 g. of N-(6-chloro-5-quinolyl)anthranilic acid, 1.4 g. of methyl iodide, 1.4 g. of potassium carbonate, and 100 ml. of N,N-dimethylformamide is heated at 60° C. for 2 hours, cooled, and diluted with an equal volume of water. The aqueous mixture is extracted well with ether, and the ether extract is dried and evaporated to give methyl N-(6-chloro-5-quinolyl)anthranilate; M.P. 117–118° C., following crystallization from ethanol.

In the foregoing procedure, with the substitution of 1.56 g. of ethyl iodide for the methyl iodide, there is obtained ethyl N-(6-chloro-5-quinolyl)anthranilate.

Example 6

A mixture consisting of 2.9 g. of N-(6-chloro-5-quinolyl)anthranilic acid, 1.44 g. of 2-dimethylaminoethyl chloride, 3 ml. of triethylamine, and 25 ml. of N,N-dimethylformamide is heated at 90–100° C. for 30 hours. After cooling, the solid triethylamine hydrochloride is removed by filtration, and the filtrate is extracted with three 20-ml. portions of 1 N hydrochloric acid. The acidic extract is made alkaline (pH 10) with aqueous sodium hydroxide, and the alkaline solution is extracted with ether. The ether extract is washed with water, dried, and evaporated to yield 2-dimethylaminoethyl N-(6-chloro-5-quinolyl)anthranilate. The hydrochloride salt of this ester can be obtained by treating the ethereal solution of the basic ester with an excess of dry hydrogen chloride and isolating and drying the salt that precipitates.

In a similar manner, from the reaction of 2.9 g. of N-(2,6-dimethyl-5-quinolyl)anthranilic acid and 1.86 g. of 3-diethylaminopropyl chloride hydrochloride there is obtained 3-diethylaminopropyl N-(2,6-dimethyl-5-quinolyl)anthranilate and the hydrochloride salt thereof.

I claim:
1. A member of the class consisting of N-(5-quinolyl) anthranilic acid compounds having the formula

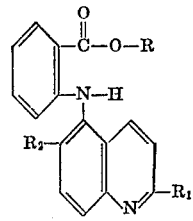

and pharmaceutically-acceptable salts thereof; where R is a member of the class consisting of hydrogen, lower alkyl, and aminoalkyl; $R_1$ is a member of the class consisting of hydrogen and methyl; and $R_2$ is a member of the class consisting of methyl and chlorine.

2. A compound according to claim 1 wherein R is hydrogen.

3. A compound according to claim 1 which is N-(6-methyl-5-quinolyl)anthranilic acid.

4. A compound according to claim 1 which is N-(6-chloro-5-quinolyl)anthranilic acid.

5. A compound according to claim 1 which is N-(2,6-dimethyl-5-quinolyl)anthranilic acid.

6. Process for the production of an N-5-quinolyl anthranilic acid compound having the formula

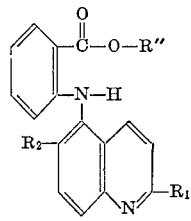

which comprises reacting a 2-aryliodoniobenzoate having the formula

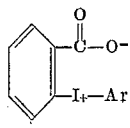

with a 5-aminoquinoline compound having the formula

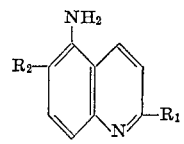

where Ar is a monovalent, unactivated, aromatic radical; R" is a member of the class consisting of hydrogen and metal cations; and $R_1$ and $R_2$ are as defined in claim 1.

7. Process according to claim 6 wherein Ar is a member of the class consisting of phenyl and mesityl.

References Cited
UNITED STATES PATENTS

| | | | |
|---|---|---|---|
| 1,810,267 | 6/1931 | Desamari | 260—287 |
| 2,919,199 | 4/1947 | Burckhalter et al. | 260—287 X |
| 3,150,047 | 9/1964 | Allais et al. | 260—287 X |
| 3,174,972 | 3/1965 | Allais et al. | 260—287 |

OTHER REFERENCES

British patent specification 183,454, 3 pp. (not accepted), printed 1924.

ALEX MAZEL, Primary Examiner

D. G. DAUS, Assistant Examiner

U.S. Cl. X.R.

260—247, 270, 286, 288, 332.2, 347.3, 471, 476, 518, 515, 999